Figure 1:
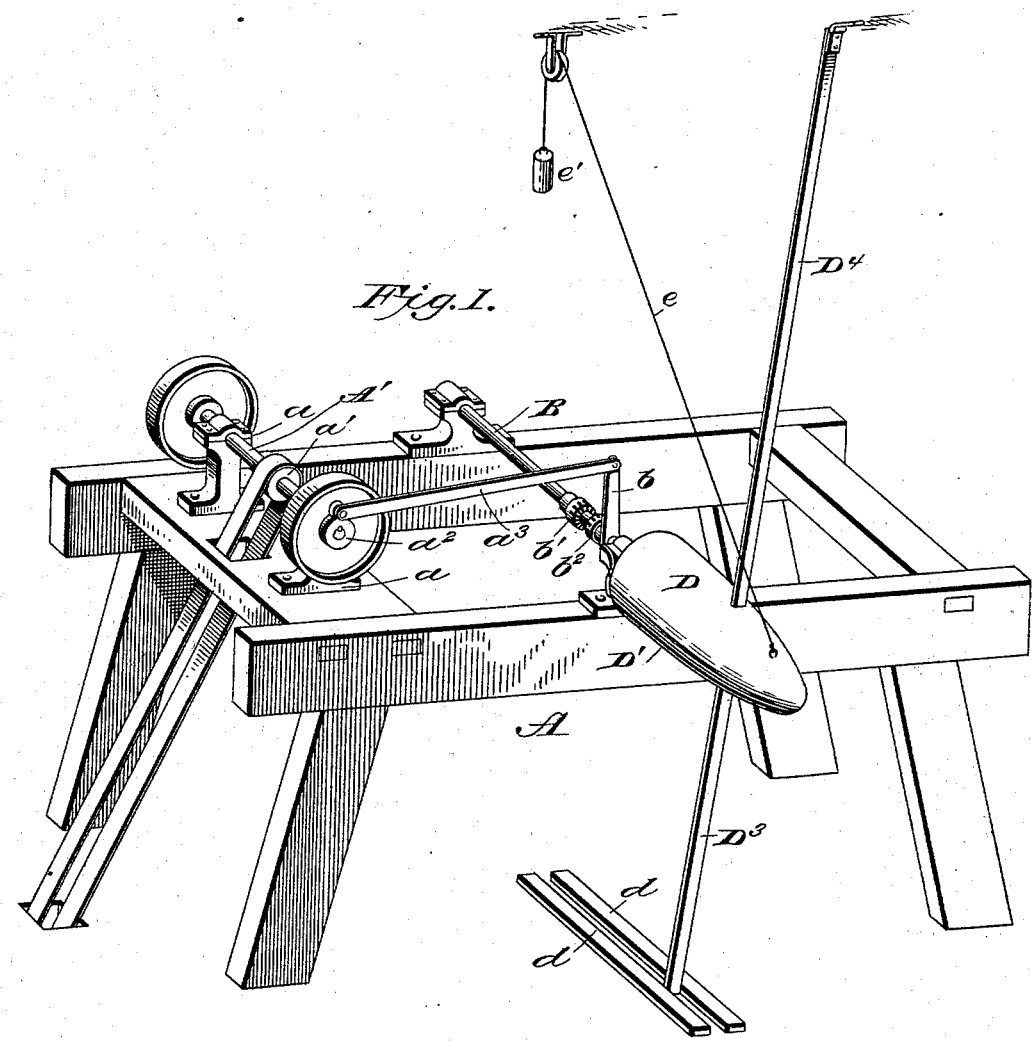

(No Model.)   2 Sheets—Sheet 1.

R. HEATON.
FELTING MACHINE.

No. 527,283.   Patented Oct. 9, 1894.

WITNESSES
G. S. Elliott.
T. W. Johnson.

Ryan Heaton
INVENTOR by _____ Attorney.

(No Model.) 2 Sheets—Sheet 2.
R. HEATON.
FELTING MACHINE.
No. 527,283. Patented Oct. 9, 1894.
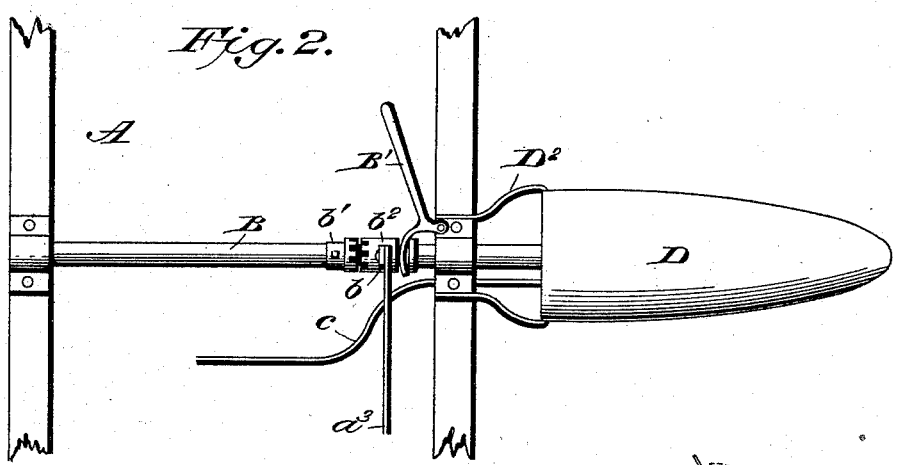
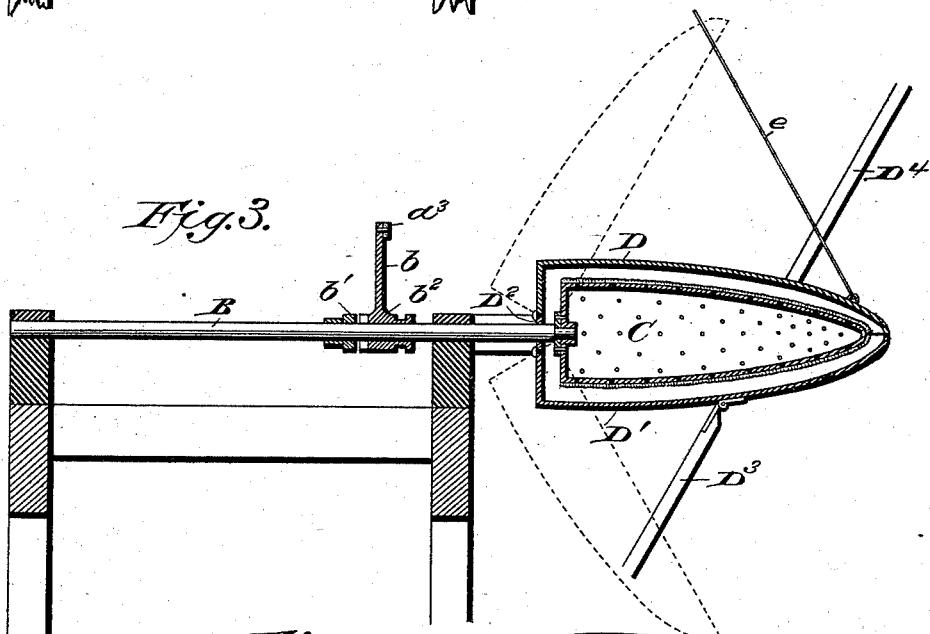
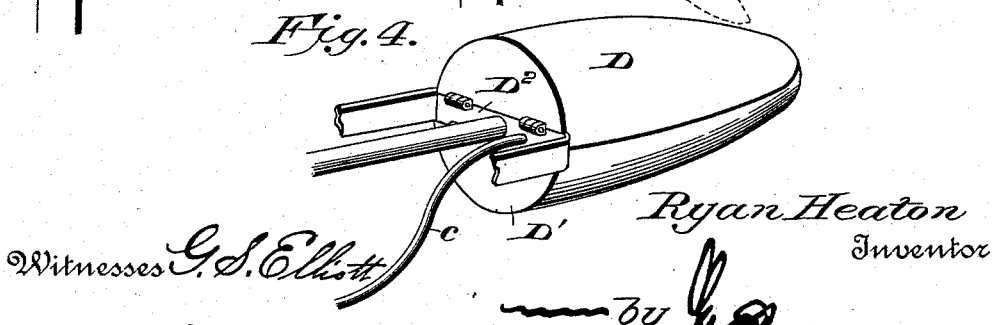
Witnesses G. S. Elliott
Ryan Heaton
Inventor
By
Attorney

UNITED STATES PATENT OFFICE.

RYAN HEATON, OF HOWELL'S DEPOT, NEW YORK.

FELTING-MACHINE.

SPECIFICATION forming part of Letters Patent No. 527,283, dated October 9, 1894.

Application filed June 22, 1894. Serial No. 515,442. (No model.)

*To all whom it may concern:*

Be it known that I, RYAN HEATON, a citizen of the United States of America, residing at Howell's Depot, in the county of Orange and State of New York, have invented certain new and useful Improvements in Felting-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a machine for forming and hardening felted fabric by the rapid vibratory or reciprocating motion of a cone between two formers or shells, steam being admitted into the cone, as will be hereinafter fully set forth and particularly pointed out in the claims.

In the accompanying drawings, Figure 1 is a perspective view of a felt hardening or shaping machine constructed in accordance with my invention. Fig. 2 is a plan view. Fig. 3 is a sectional view, and Fig. 4 is detail perspective view.

A designates a rectangular frame which is made up of side and end pieces which are connected to each other in any suitable manner and are supported at the corners by legs as shown. Upon one of the end pieces of the frame are mounted bearings $a$ $a$ for a shaft A', said shaft being driven by a belt which passes over a pulley $a'$ keyed thereon. At one end of the shaft A' is rigidly attached a crank-arm $a^2$ the outer end of which is connected by a rod $a^3$ to an arm $b$ mounted on a shaft B supported in bearings which rest upon the side pieces of the frame A. The shaft B has rigidly attached thereto a sleeve $b'$ having a clutch face with which engages a clutch $b^2$ loosely mounted on the shaft, the arm $b$ hereinbefore referred to being rigidly secured to this clutch or formed integral therewith. The clutch $b^2$ is thrown in and out of engagement with the sleeve $b'$ by means of a lever B' pivoted to one of the side pieces of the frame. It will be observed that by this construction when the shaft A' is rotated a vibratory motion will be given to the arm $b$ which will be imparted to the shaft B when the clutch faces are in engagement with each other.

To one end of the shaft B is rigidly attached a hollow cone C which is made up of sheet metal perforated as shown in Fig. 3. To this cone is suitably connected a pipe $c$ which is for the purpose of leading steam to the interior of the same.

D and D' designate two parts of a shell which are hinged to a support or bracket $D^2$ extending from one of the side pieces of the frame A, and these two parts are adapted to incase the cone C when they are brought together. To the part D' is hinged a bar $D^3$ the lower end of which moves between guides $d$ $d$ secured to the floor near the frame A, and by moving the bar $D^3$, which is done by hand the lower part of the shell is raised and lowered. The upper part D of the shell is held in contact with the lower part by means of a bar $D^4$ which is hinged to the ceiling so that the lower end thereof can bear upon the said part D. When it is desired to raise the upper part of the shell it is only necessary to disengage the bar $D^4$ therefrom by hand, the said part being then raised by a flexible connection $e$ and weight $e'$ attached thereto, the flexible connection passing over a pulley suspended from the ceiling.

The bat or felt is placed within the shell after the cone has been covered with a coarse fabric. Steam is admitted to the interior of the hollow cone and the clutch thrown into engagement with the sleeve so that the vibratory motion of the arm will be imparted to the cone for the purpose of hardening the bat.

This device is especially adapted for use in the manufacture of felt boots.

Having thus described my invention, what I claim as new, and desire to secure by Letters Patent, is—

1. In a felt hardening or forming machine, the combination of a hollow cone, means for imparting a vibratory movement thereto, and a shell formed of parts D and D' which are adapted to incase the cone, together with bars $D^3$ and $D^4$ which bear against the parts of the shell and hold them together, substantially as shown and for the purpose set forth.

2. In a felting machine, the combination of an oscillating shaft B, a cone C secured to one end of the shaft, a shell formed of parts D and D' which incase the cone, a bracket to which the parts of the shell are hinged the upper part of the shell being provided with a weighted flexible connection for elevating the same, a bar $D^4$ for holding the said upper part depressed, a bar $D^3$ hinged to the lower part of the shell and guides with which the bar $D^3$ engages for holding the lower shell elevated, substantially as shown and for the purpose set forth.

In testimony whereof I affix my signature in presence of two witnesses.

RYAN HEATON.

Witnesses:
JABEZ HEATON,
RENNIE BREEN.